Figure 1:
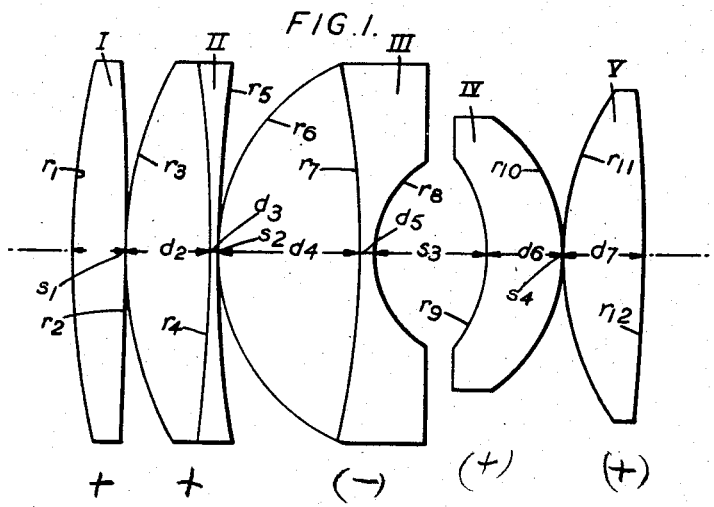

Nov. 8, 1949          C. G. WYNNE          2,487,750
WIDE APERTURE OBJECTIVE HAVING TWO MENISCUS DISPERSIVE
COMPONENTS AND TWO OR MORE COLLECTIVE COMPONENTS
Filed Nov. 27, 1946

Inventor
Charles G. Wynne
by Ralph B. Stewart
Attorney

Patented Nov. 8, 1949

2,487,750

UNITED STATES PATENT OFFICE 2,487,750

WIDE APERTURE OBJECTIVE HAVING TWO MENISCUS DISPERSIVE COMPONENTS AND TWO OR MORE COLLECTIVE COMPONENTS

Charles Gorrie Wynne, Bromley Hill, England, assignor to Wray (Optical Works) Limited, Bromley Hill, England, a British company Application November 27, 1946, Serial No. 712,633
In Great Britain December 7, 1945

5 Claims. (Cl. 88—57)

This invention relates to optical lenses of very large relative aperture, for example, of the order of F/1, and to the kind of lens having at least one dispersive meniscus member which is a compound component concave to the aperture stop and placed between two collective members, the collective member on the convex side of the dispersive meniscus consisting of two or more collective components.

In previous lenses of this kind, these front collective components have all been of meniscus form, but according to the present invention, while the front component adjacent to the dispersive meniscus is of meniscus form, the one most remote from the dispersive meniscus is bi-convex. It will be understood that the "front" side of the dispersive meniscus is the side of the lens nearer to the longer conjugate or the side facing the incident light. By the provision of this bi-convex component, higher order undercorrection of the tangential field curvature for oblique pencils is obtained with a resulting reduction in the total field curvature and astigmatism.

There may be more collective components than the meniscus adjacent the dispersive meniscus and the bi-convex component, for example, between them there may be a plano-convex component having its plane face facing the aperture stop. The invention may be applied to lenses corrected for an infinitely distant object or to copying lenses at some other pair of conjugates. Other features which may be provided in accordance with the invention to improve the combination consist in having the outer surface of the outer bi-convex component with a radius of curvature greater than 1.5$p$, where $p$ is the diameter of the entrance pupil of the lens. Again, the dispersive compound meniscus may consist of a dispersive element and a collective element with the mean refractive index of the former greater than that of the latter by at least 0.04. This dispersive compound meniscus may have a cemented surface which is dispersive, which surface should have a curvature not greater than +1.25 and not less than —.75 of the reciprocal of the focal length, positive curvature in this connection being concavity towards the aperture stop.

The collective components on the convex side of the compound dispersive meniscus may be single elements or cemented doublets, or as an example, one of each. Instead of actual cemented surfaces, one or more may be replaced by a small air space with or without a small difference of radius between the two adjacent surfaces.

A 4:1 copying lens with a relative aperture of F/1 may be made with two collective components on the convex side of the dispersive meniscus consisting of an inner meniscus component and an outer bi-convex component, as indicated above. A 2:1 copying lens can be made with an additional plano-convex collective component between the two said components.

Figure 2:
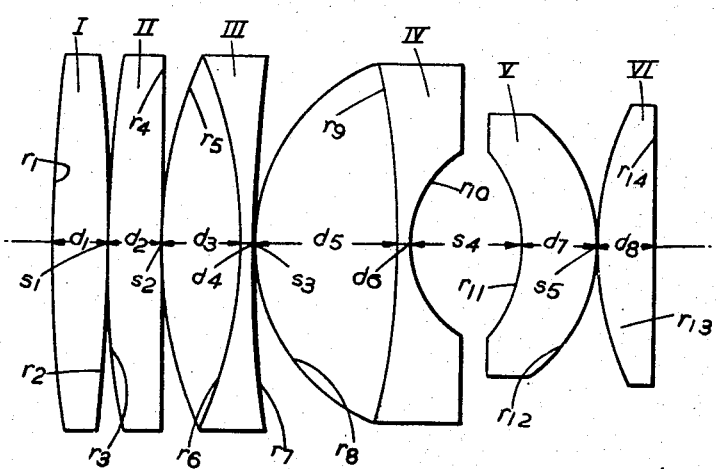

In order that the invention may be clearly understood and readily carried into effect, two examples of the novel lens will now be more fully described with reference to the accompanying drawings, in which:

Figure 1 is a section of the components of a 4:1 copying lens according to the invention; and Figure 2 is a similar section of a 2:1 copying lens with an additional collective component.

In Figure 1, the five components taken from the front are indicated at I, II, III, IV and V. The dispersive meniscus is seen at III, the adjacent collective meniscus at II while I is the bi-convex collective component and the back components on the opposite side of the aperture stop are IV and V, being respectively a single meniscus member concave to the aperture stop and a single collective element.

The numerical data for this example are given in the following table, in which $r_1$, $r_2$ ... are the radii of curvature of the individual surfaces taken from the front, the plus sign indicating that the surface is convex to the front, and the minus sign that it is concave to the front, while $d_1$, $d_2$ ... are the axial thicknesses of the various lens elements and $s_1$, $s_2$ ... are the axial lengths of the air spaces between the components. These dimensions are correspondingly marked in Figure 1.

The lens is a 4:1 copying lens, equivalent focal length 1.000 and relative aperture F/1.0. In the table, $n_D$ in column 3 is the mean refractive index of the respective component, and V in the fourth column is the Abbé number.

| Component | Radii | Thickness | $n_D$ | V |
|---|---|---|---|---|
| I | $r_1$ +1.6200 | $d_1$ .1048 | 1.613 | 59.3 |
|   | $r_2$ —7.6520 | $s_1$ 0 |  |  |
| II | $r_3$ + .7500 | $d_2$ .1660 | 1.613 | 59.3 |
|   | $r_4$ —2.929 | $d_3$ .0175 | 1.613 | 36.9 |
|   | $r_5$ +2.929 | $s_2$ 0 |  |  |
| III | $r_6$ + .4090 | $d_4$ .2796 | 1.589 | 61.2 |
|   | $r_7$ —1.7475 | $d_5$ .0262 | 1.700 | 30.3 |
|   | $r_8$ + .2128 | $s_3$ .2184 |  |  |
| IV | $r_9$ — .2907 | $d_6$ .1485 | 1.652 | 33.6 |
|   | $r_{10}$ — .3266 | $s_4$ 0 |  |  |
| V | $r_{11}$ + .5638 | $d_7$ .1573 | 1.717 | 47.7 |
|   | $r_{12}$ —3.295 |  |  |  |

In Figure 2, the six components taken from the front are indicated at I, II, III, IV, V and VI.

The components I, III, IV, V and VI correspond to the components in Figure 1, but in Figure 2 the component II is an additional front plano-convex collective component. Again, the numerical data for this example are given in the following table, in which the particulars have the same significance as in Figure 1 and are correspondingly marked in Figure 2.

The lens is a 2:1 copying lens, equivalent focal length 1.00 and the relative aperture F/1.0.

| Component | Radii | Thickness | $n_D$ | V |
|---|---|---|---|---|
| I | $r_1$ +2.870 | $d_1$ .1047 | 1.613 | 59.9 |
|   | $r_2$ −3.492 | $s_1$ 0 | | |
| II | $r_3$ +2.182 | $d_2$ .1047 | 1.613 | 59.9 |
|    | $r_4$ ∞ | $s_2$ 0 | | |
| III | $r_5$ +0.9700 | $d_3$ .1571 | 1.613 | 59.9 |
|     | $r_6$ − .8732 | $d_4$ .0262 | 1.613 | 36.9 |
|     | $r_7$ +3.492 | $s_3$ 0 | | |
| IV | $r_8$ + .3796 | $d_5$ .2794 | 1.613 | 59.9 |
|    | $r_9$ −1.746 | $d_6$ .0262 | 1.700 | 30.3 |
|    | $r_{10}$ + .2101 | $s_4$ .2182 | | |
| V | $r_{11}$ − .2812 | $d_7$ .1484 | 1.652 | 33.6 |
|   | $r_{12}$ − .3184 | $s_5$ 0 | | |
| VI | $r_{13}$ + .6294 | $d_8$ .1135 | 1.717 | 47.7 |
|    | $r_{14}$ ∞ | | | |

It will be observed that in both of the above examples where the equivalent focal length is 1.000 and the relative aperture F/1.0, $p$ equals 1.00 and in both cases $r_1$ is clearly greater than $1.5p$. Again, the mean refractive indices of the dispersive component III in Figure I and IV in Figure 2 is 1.700 and of the collective component in Figure 1 is 1.589 and in Figure 2, 1.613; thus the differences, 0.111 and 0.087 are both greater than 0.04. Moreover, in both examples the cemented surface of the compound meniscus is dispersive and as the reciprocal of the focal length of the lens is 1.0 it will be seen that the curvature of the cemented surface which is the reciprocal of $r_7$ in Figure 1 and of $r_9$ in Figure 2 amounts to −.5725 in the first case and −.5727 in the second case, so that in both cases it is not greater than +1.25 and not less than −0.75 of the reciprocal of the focal length of the lens.

I claim:

1. An optical lens system of large relative aperture, comprising a plurality of axially aligned components including a dispersive compound meniscus member concave to the aperture stop and convex to the incident light, and having a cemented surface which is dispersive and has a curvature not greater than +1.25 and not less than −0.75 of the reciprocal of the focal length of the lens system, positive curvature being considered as concavity towards the aperture stop, a back collective member on the concave side of said dispersive meniscus member and a front collective member on the convex side of said dispersive meniscus member, said last-named collective member comprising a component of meniscus form adjacent said dispersive meniscus member and a bi-convex component more remote from said dispersive meniscus member.

2. An optical lens system of large relative aperture, comprising a plurality of axially aligned components including a dispersive compound meniscus member concave to the aperture stop and convex to the incident light, and having a cemented surface which is dispersive and has a curvature not greater than +1.25 and not less than −0.75 of the reciprocal of the focal length of the lens system, positive curvature being considered as concavity towards the aperture stop, a back collective member on the concave side of said dispersive meniscus member and a front collective member on the convex side of said dispersive meniscus member, said last-named collective member comprising a component of meniscus form adjacent said dispersive meniscus member, a bi-convex component more remote from said dispersive meniscus member and a plano-convex component between said last-mentioned two components and having its plane surface facing the aperture stop.

3. An optical objective of large relative aperture comprising a dispersive compound meniscus member convex to the incident light and concave to the aperture stop, collective members arranged in front of and in back of said dispersive member and in axial alignment therewith, said front collective member comprising a collective component of meniscus form adjacent said dispersive member having its concave surface substantially in contact with the convex surface of said dispersive member and a bi-convex component in front of said collective component and having a back surface of a larger radius of curvature than its front surface, the outer surface of said bi-convex component having a radius of curvature greater than 1.5 times the diameter of the entrance pupil of the objective, said compound dispersive member being formed of a front collective element and a rear dispersive element having a mean refractive index greater than the front element by at least 0.04, and the cemented surface of said compound dispersive member being dispersive and having a curvature not greater than +1.25 and not less than −0.75 of the reciprocal of the focal length of the objective.

4. An optical objective comprising a plurality of axially aligned components having numerical data substantially as set forth in the following table:

[Equivalent focal length 1.000]

| Component | Radii | Thickness or separation | Mean refractive index $n_D$ | Abbé V number |
|---|---|---|---|---|
| I | $r_1$=+1.6200 | $d_1$= .1048 | 1.613 | 59.3 |
|   | $r_2$=−7.6520 | $s_1$=0 | | |
| II | $r_3$=+ .7500 | $d_2$= .1660 | 1.613 | 59.3 |
|    | $r_4$=−2.929 | $d_3$= .0175 | 1.613 | 36.9 |
|    | $r_5$=+2.929 | $s_2$=0 | | |
| III | $r_6$=+ .4090 | $d_4$= .2796 | 1.589 | 61.2 |
|     | $r_7$=−1.7475 | $d_5$= .0262 | 1.700 | 30.3 |
|     | $r_8$=+ .2128 | $s_3$= .2134 | | |
| IV | $r_9$=− .2907 | $d_6$= .1485 | 1.652 | 33.6 |
|    | $r_{10}$=− .3266 | $s_4$=0 | | |
| V | $r_{11}$=+ .5638 | $d_7$= .1573 | 1.717 | 47.7 |
|   | $r_{12}$=−3.295 | | | | wherein $r_1$, $r_2$ ... indicate the radii of the individual surfaces counting from the front, $d_1$, $d_2$ ... indicate the axial thicknesses of the individual elements and $s_1$, $s_2$ ... indicate the axial air separations between the components.

5. An optical objective comprising a plurality of axially aligned components having numerical data substantially as set forth in the following table:

[Equivalent focal length 1.000]

| Component | Radii | Thickness or separation | Mean refractive index $n_D$ | Abbé V number |
|---|---|---|---|---|
| I | $r_1 = +2.870$ | $d_1 = .1047$ | 1.613 | 59.9 |
|  | $r_2 = -3.492$ | $s_1 = 0$ |  |  |
| II | $r_3 = +2.182$ | $d_2 = .1047$ | 1.613 | 59.9 |
|  | $r_4 = \infty$ | $s_2 = 0$ |  |  |
| III | $r_5 = +.9700$ | $d_3 = .1571$ | 1.613 | 59.9 |
|  | $r_6 = -.8732$ | $d_4 = .0262$ | 1.613 | 36.9 |
|  | $r_7 = +3.492$ | $s_3 = 0$ |  |  |
| IV | $r_8 = +.3796$ | $d_5 = .2794$ | 1.613 | 59.9 |
|  | $r_9 = -1.746$ | $d_6 = .0262$ | 1.700 | 30.3 |
|  | $r_{10} = +.2101$ | $s_4 = .2182$ |  |  |
| V | $r_{11} = -.2812$ | $d_7 = .1484$ | 1.652 | 33.6 |
|  | $r_{12} = -.3184$ | $s_5 = 0$ |  |  |
| VI | $r_{13} = +.6294$ | $d_8 = .1135$ | 1.717 | 47.7 |
|  | $r_{14} = \infty$ |  |  |  | wherein $r_1, r_2 \ldots$ indicate the radii of the individual surfaces counting from the front, $d_1, d_2 \ldots$ indicate the axial thicknesses of the individual elements and $s_1, s_2 \ldots$ indicate the axial air separations between the components.

CHARLES GORRIE WYNNE.

REFERENCES CITED

The following references are of record in the file of this patent:

UNITED STATES PATENTS

| Number | Name | Date |
|---|---|---|
| 1,584,271 | Bertele | May 11, 1926 |
| 1,839,011 | Bielicke | Dec. 29, 1931 |
| 2,012,822 | Lee | Aug. 27, 1935 |
| 2,019,985 | Lee | Nov. 5, 1935 |
| 2,106,077 | Tronnier | Jan. 18, 1938 |
| 2,259,004 | Schade | Oct. 14, 1941 |
| 2,319,171 | Warmisham et al. | May 11, 1943 |